(12) United States Patent
Ostromoukhov et al.

(10) Patent No.: US 7,911,651 B2
(45) Date of Patent: Mar. 22, 2011

(54) METHOD FOR SCREENING AN IMAGE

(75) Inventors: Victor Ostromoukhov, Outremont (CA); Nicolas Monnerie, Quetigny (FR)

(73) Assignee: Sagem Communication, Paris (FR)

( * ) Notice: Subject to any disclaimer, the term of this patent is extended or adjusted under 35 U.S.C. 154(b) by 551 days.

(21) Appl. No.: 11/658,932

(22) PCT Filed: May 31, 2005

(86) PCT No.: PCT/FR2005/050395
§ 371 (c)(1),
(2), (4) Date: Jun. 20, 2008

(87) PCT Pub. No.: WO2006/018554
PCT Pub. Date: Feb. 23, 2006

(65) Prior Publication Data
US 2009/0009811 A1    Jan. 8, 2009

(30) Foreign Application Priority Data
Jul. 28, 2004  (FR) .................................... 04 51695

(51) Int. Cl.
H04N 1/405 (2006.01)
(52) U.S. Cl. ...................................... 358/3.2; 358/3.06
(58) Field of Classification Search .................. 358/1.9, 358/3.01, 3.06, 3.13, 3.2, 3.21, 3.22, 534, 358/535, 536
See application file for complete search history.

(56) References Cited

U.S. PATENT DOCUMENTS
4,894,726 A  1/1990  Steinhardt et al.
2003/0123093 A1  7/2003  Hattori

FOREIGN PATENT DOCUMENTS
EP  1 111 905 A  6/2001

OTHER PUBLICATIONS

Glassner, "Penrose Tiling," IEEE Computer Graphics & Applications, IEEE Inc. New York, USA, 18(4):78-86 (1998).
Ulichney, "Dithering With Blue Noise," Proceedings of the IEEE, IEEE, New York, USA, 76(1):56-79 (1988).

Primary Examiner — Thomas D Lee
(74) Attorney, Agent, or Firm — Patterson Thuente Christensen Pedersen, P.A.

(57) ABSTRACT

To improve the rendering of a printing, a halftone rendering method is applied. This method optimally comprises a step for the adaptive tiling of the image. This tiling is based on a subdivision of the image by self-similar structures. These subdivisions are locally limited by the local intensity of the image. These local limitations make the tiling adaptive. The result of this tiling is a cloud of sampling structures, each of these structures being associated with a pixel of the image and a label produced during the tiling. The intensity of the pixel, and the label, enable the reading, in a table of correction vectors, of a correction vector corresponding to a shift to be applied to the pixel before it is printed. The table of the correction vectors is pre-computed in using a relaxation algorithm.

13 Claims, 2 Drawing Sheets

METHOD FOR SCREENING AN IMAGE

RELATED APPLICATIONS

This application claims priority to PCT Application No. PCT/FR2005/050395 filed May 31, 2005, and French Application No. 0451695 filed Jul. 28, 2004 the disclosures of which are hereby incorporated by reference in their entirety.

TECHNICAL FIELD

The present invention relates to a method for the screening or rendering of images, especially when printing these images. More particularly, the field of the invention is that of halftone printing in which a memorized image is printed in a format known as a gray shade format, this term being extended to color images which are actually formed by the superimposition of three monochromatic images. Even more particularly, the field of the invention is that of printers such as those used for example in fax reception apparatuses.

BACKGROUND OF THE INVENTION

In the prior art, the halftone rendering methods most commonly used are the error-diffusion or threshold matrix methods.

Threshold matrices may be dispersed or grouped or they may be a blue noise mask. The methods based on the matrices perform well in terms of processing speed but suffer from the appearance of regular structures.

The error-diffusion method suffers from the appearance of structure artifacts, especially waves. Waves characterize artifacts linked to repetitive structures, especially those obtained by the matrices. Structure artifacts take the form of changes in shape that are apparently irregular though visible to the naked eye. This can be resolved by implementing a trip of the image in serpentine mode, corresponding to a change in direction of the processing of the image at each row of the image. The term "round trip" of the image is also used.

Furthermore, in the image-processing systems of embedded printing circuits, the block processing of an image is the most optimized mode, especially for making specialized circuits. Now block processing of this kind adapts poorly to error diffusion algorithms because of the use of the serpentine mode. Chang and Allebach have proposed a block-screening algorithm, but this algorithm is complex to implement and calls for lengthy setting phases and a great deal of know-how to give good results.

SUMMARY OF THE INVENTION

The invention resolves these problems by proposing an algorithm equivalent to the implementation of error diffusion in a one-way trip of the image. In the invention, an aperiodic tiling of an image is done. The result of the tiling is a cloud of dots corresponding to sampling structures of the tiling. The tiling is furthermore adaptive in the sense that its density depends on the intensity of the image. In this document, the intensity of the image is considered to be linked to the encoding of the dots of the image. These dots or pixels are, for example, encoded by a number contained in the interval [0,255]. The greater the value by which a pixel is encoded, the higher is its intensity. The tiling is done by the subdivision of a structure in a self-similar manner. At each subdivision, the new structures are named (they are assigned a label) as a function of the label of the subdivided structure. At the end of the tiling, each structure therefore has a label. This label is used firstly to determine a threshold assigned to the structure and secondly as an input in a dual-input correction table. The other input of the correction table depends on the intensity of the pixel considered. The correction table comprises vectors used for the readjustment of the dot before printing. The result is a printed image that no longer has any artifact detectable by the human eye.

A tiling is set to be aperiodic if the frequencies of appearance of the elements that constitute it cannot be expressed by means of ratios of whole numbers. In an equivalent way, it is also said that a tiling is aperiodic if no periodic tiling is possible on the basis of the set of basic tiles that constitute the tiling. The tiling is said to be aperiodic when it accepts a translational symmetry of a finite vector.

An object of the invention therefore is a method for screening an image before printing, characterized in that it comprises the following steps implemented by a screening device:

tiling the image to be screened by an aperiodic structure obtained by the implementation of a self-similar structure, i.e. the tiling is done from a structure divided according to rules to give new structures which are again divided according to these same rules; among the structures, sampling structures and subdivision structures are distinguished, it being possible to liken the sampling structures to dots, and only the subdivision structures are again divided, the tiling is adaptive because it depends on the intensity of the zone of the image covered by the structure to be divided, the division of the structure being interrupted when this intensity becomes lower than a predetermined threshold, the division is interrupted when the density of structure per unit of surface area of the image becomes higher than a threshold, at each division, the screening device assigns a label to each new structure as well as to the existing sampling structures, at the end of the tiling process, each sampling structure is associated with a pixel that is shifted as a function of a correction vector found in a dual-input correction table, the first of the inputs being the label of the sampling structure, the second of the inputs being the intensity of the image at the point corresponding to the sampling structure, each sampling structure remaining associated with the dot of the image that has served it as an input in the correction table, each sampling structure has an associated threshold as a function of the label of the sampling structure, the thresholds determined in the previous steps are used to implement a halftone rendering method.

Advantageously, the invention is also characterized in that the halftone rendering method implemented is a threshold matrix method.

Advantageously, the invention is also characterized in that the halftone rendering method implemented is an error diffusion algorithm.

Advantageously, the invention is also characterized in that the subdivision structures are polygons.

Advantageously, the invention is also characterized in that the polygons are triangles.

Advantageously, the invention is also characterized in that the label of a new structure is derived from the label of the structure from which it had been created.

Advantageously, the invention is also characterized in that before the use of the thresholds determined in the preceding steps for the implementation of a halftone rendering method, the screening device implements a relaxation algorithm on the sampling structures to determine the correction vectors of the correction table.

Advantageously, the invention is also characterized in that during the subdivision of a subdivision structure into two new subdivision structures, the ratio of the areas of the new structures is constant for all the subdivisions.

Advantageously, the invention is also characterized in that the ratio is equal to the golden ratio squared, one value of which, rounded out to the second decimal point, is 1.61.

Advantageously, the invention is also characterized in that the label associated with the structure is binary, the six most significant bits of this label are used to produce the first input, the value of each of these bits is multiplied by Fi where ii in the interval [2, 7], and Fi is the number corresponding to the Fibonacci sequence, the most significant bit being multiplied by F7, the less significant bit by F6, and so on and so forth up to the sixth most significant bit.

Advantageously, the invention is also characterized in that the second input is equal to:

$$\log_{phi\,2}(\sqrt{5}\cdot x) \bmod 1$$

where phi is the golden ratio, and x is the intensity of the image associated with the sampling structure, the real interval [0, 1] being divided into N intervals, thus enabling the association of the preceding function result with an integer in the interval [0, N−1], this integer being the second input.

Advantageously, the invention is also characterized in that N is equal to 8.

Advantageously, the invention is also characterized in that the image to be processed is divided into blocks, each of these blocks being processed by the method.

BRIEF DESCRIPTION OF THE DRAWINGS

The invention will be understood more clearly from the following description and the accompanying figures. These figures are given by way of an indication and in no way restrict the scope of the invention. Of these figures.

DETAILED DESCRIPTION OF THE DRAWINGS

The steps of the method according to the invention are implemented by a device for screening an image. Such a device reads an image in a memory and produces a screened image recorded in another memory or directly printed on a paper-type physical carrier. In the invention, an image or an image blocks can be likened to a matrix of dots also called pixels, each pixel having coordinates in the matrix and each pixel being associated with an intensity. In the present example, the intensity is deemed to be encoded by a byte, i.e. an integer value included in the interval [0,255].

In general, when an action is attributed to an apparatus, this action is performed by a microprocessor of the apparatus controlled by instruction codes recorded in a memory of the apparatus.

Figure 1:
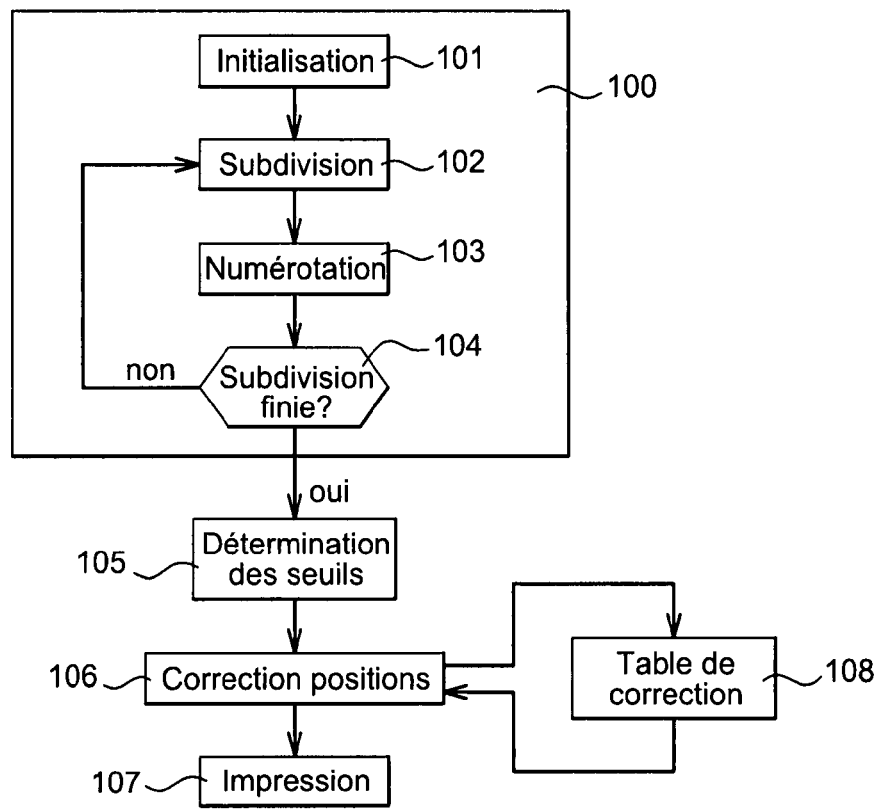
FIG. 1 is an illustration of steps of the method according to the invention.

FIG. 1 shows a step 100 for the tiling of an image by an aperiodic structure. In this document, the term "tiling" refers to the action of overlaying an aperiodic structure on an image. In the prior art, the fact of tiling an image by an aperiodic structure is known, especially from the documents U.S. Pat. No. 4,894,726, U.S. Pat. No. 5,179,448, and U.S. Pat. No. 5,379,118. These aspects are also discussed by Grünbaum and Shephard in 'Tilings and Patterns'. These documents illustrate the Penrose tiling but there are other forms of tiling such as the Ammann Beeker tiling. The basic principles for carrying out a tiling of this kind are recalled herein.

FIG. 1 shows a step 101 for initializing the tiling process, in which an initial structure 202 of the tiling is overlaid on an image. In the present simplified example, the structure 202 is a triangle whose dimensions are sufficient to contain the image 201. In practice, the structure 202 may be more complex and may itself be divided into several structures. The structure 202 is associated, again in an example, with the label 0. The structure 202 is a structure known as a subdivision structure.

From the step 101, the method passes to a subdivision step 102. In this step, all the subdivision structures resulting from the previous subdivision step are subdivided according to predetermined rules. This gives new subdivision structures and new sampling structures.

In practice, a subdivision structure is a structure that will be subdivided during the subdivision process, whereas a sampling structure can be likened to a dot and associated with the pixel of the tiled image. The result of the subdivision process is a cloud of sampling structures, hence of pixels. A cloud of pixels is a set of pixels having a plane spatial dispersion. Each pixel will then be processed as a function of the sampling structure with which it is associated. In this process, for a given image, the cloud of sampling structures is invariant whereas the cloud of pixels will be modified as a function of the cloud of sampling structures.

Figure 2A:
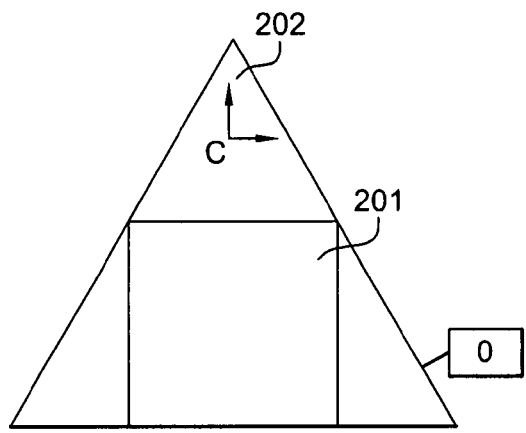
FIGS. 2a, 2b, 2c illustrate rules of subdivision.
Figure 2B:
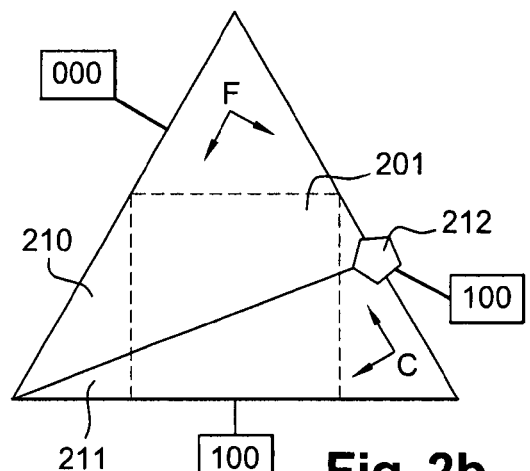

The figure shows the result of the step 102 applied to the result of the initialization step 101. FIG. 2b shows that the triangular structure 202 has been subdivided into two triangular subdivision structures 210 and 211 and one sampling structure 212. The sampling structure 212 is the intersection of the common sides of the two triangles 210 and 211. One possible rule for obtaining triangles 210 and 211 is that the ratio of their surface should be the golden ratio squared. The golden ratio rounded to the second decimal point is equal to 1.61.

From the step 102 the method passes to a step 103 for numbering new structures. In the step 103 each new structure is assigned a label depending on the label of the structure from which the new structures have come. Thus, if the structure 202 is associated with the label 0, then the labels of the structures 210 to 212 will comprise 0 complemented according to a predetermined rule. In one example, the result of the application of these rules is that the label of the structure to 10 is 000, the label of the structure 211 is 100, and label of the structure 212 is 100.

These subdivision steps are repeated, each subdivision structure being once again subdivided and the resulting structures named. The subdivision process stops when an end-of-subdivision criterion is verified.

Figure 2C:
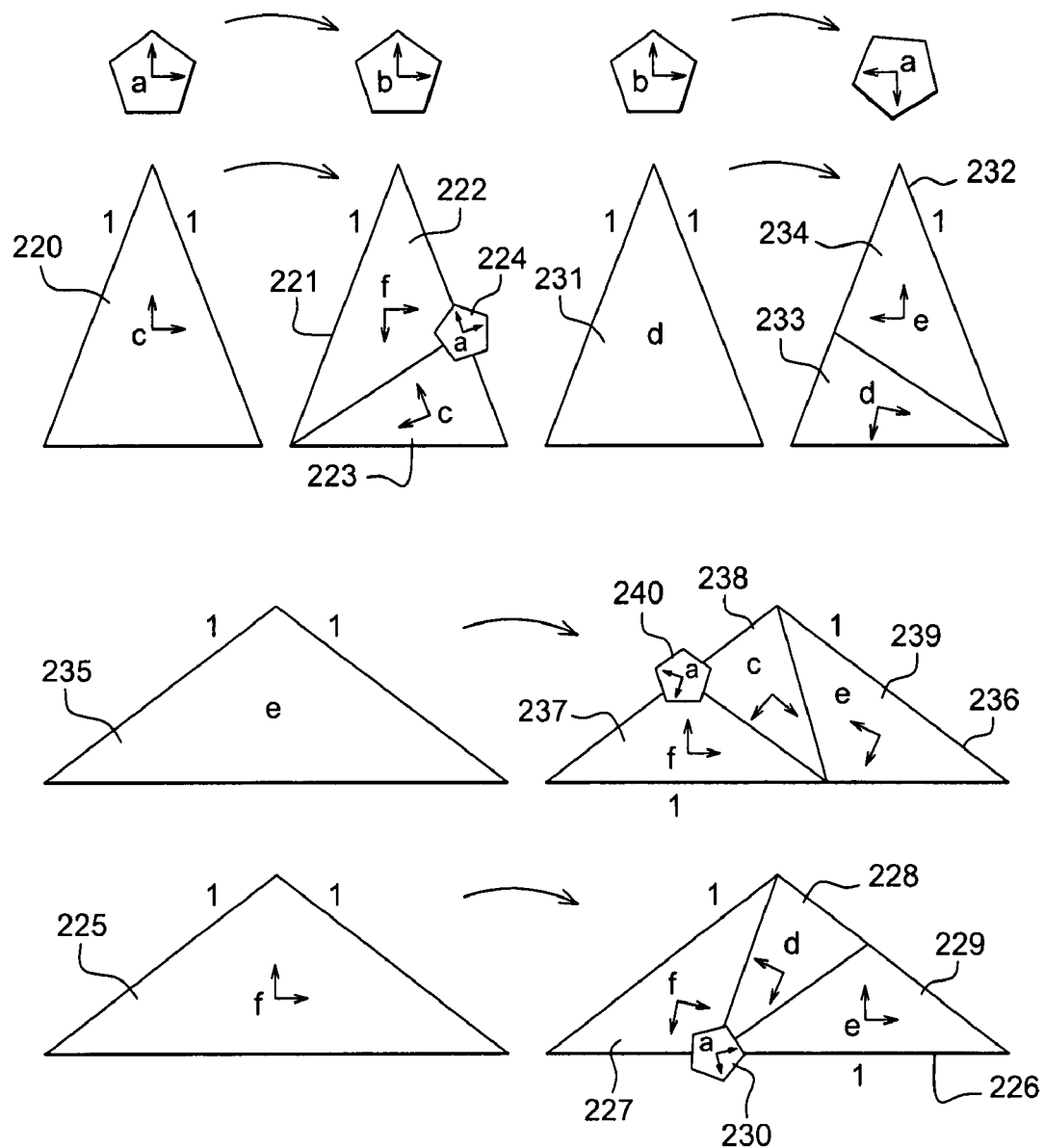

In practice, each subdivision and sampling structure is of a given type. Each type has a corresponding rule of subdivision for the subdivision structures and, as the case may be, a type-changing rule for the sampling structures. Each type of structure also has a corresponding rule for determining the label. These rules are known in the case of the tiling methods already mentioned. FIG. 2c illustrates other rules that can be used for carrying out an aperiodic tiling.

In one exemplary embodiment, 6 types of structures, 2 types of sampling structures and 4 types of subdivision structures are defined. The types of sampling structures are named a and b. Each of the structures is oriented.

In the present example, the subdivision structures are isosceles triangles. The vertex of such a triangle is the intersection of its sides of equal length. The base of such a triangle is the side opposite the vertex. In this document, the intersections of the edges of a triangle that are not the vertex are called corners. A side of such a triangle is not the base.

The type a and b structures are subjected to type-changing rules. At each iteration of the step 102, the type a structures become type b structures in keeping the same orientation. The type b structures become type a structures having undergone a 180-degree rotation. The labels of the new types a and b structures thus obtained are derived from the following rules:
- the label of the new structure a is 00 followed by the label of the original structure b,
- the label of the new structure is 00 followed by the label of the original structure a.

FIG. 2c shows a type c triangular structure 220 which is actually an isosceles triangle. If the sides of the type c triangle have a value equal to 1, i.e. corresponding to unity, then the base has a length equal to the inverse of the golden ratio expressed in the previously defined unit. In the present example, the structure 202 is a type c structure. The reference 221 illustrates the rule of subdivision of a type c structure. Thus, a type c triangle is subdivided into two triangles, including one f type triangle 222 one type c triangle 223 and one a type sampling structure 224. The reference 221 shows that the subdivision of the structure 220 also produces the sampling structure 224 which is situated at the vertex of the triangle 222. The side common to the triangles 222 and 223 is plotted from the left-hand corner of the triangle 220, the triangle 220 being oriented with the vertex upwards, the triangles 222 and 223 being Isosceles triangles and the vertex of the triangle 223 being the left-hand corner of the triangle 220.

The labels of the new type a, c and b structures thus obtained are derived from the following rules:
- the label of the new structure a is 10 followed by the label of the original structure c,
- the label of the new structure c is 10 followed by the label of the original structure c,
- the label of the new structure f is 00 followed by the label of the original structure c.

FIG. 2c shows an f type triangular structure 225 which is actually an isosceles triangle. If the sides of the f type triangle have a value equal to 1, i.e. corresponding to unity, then the base has a length equal to the golden ratio expressed in the previously defined unit. The reference 226 illustrates the rule of subdivision of an f type structure. Thus, an f type triangle is subdivided into three triangles including one f type triangle 227, one d type triangle 228, one e type triangle 229 and one a type sampling structure 230. The triangle 225 is deemed to have its vertex oriented upwards. The triangle 227 is obtained in subdividing the triangle 225 into two, along a straight line coming from the vertex of the triangle 225 and intercepting the base of the triangle 225 at a distance of 1 from the right-hand corner of the triangle 225. The right-hand part resulting from this first subdivision is again divided by a second subdivision along a straight line coming from the vertex of the triangle 227 and intercepting the right-hand side of the triangle 225 at a distance equal to the inverse of the golden ratio squared of the vertex of the triangle 225. The right-hand part of the second subdivision is the triangle 229, the other part being the triangle 228. The sampling structure 230 corresponds to the common vertex of the triangles 227 and 228.

The labels of the new type a, d, e and f structures thus obtained are derived from the following rules:
- the label of the new structure a is 01 followed by the label of the original structure f,
- the label of the new structure d is 10 followed by the label of the original structure f,
- the label of the new structure e is 00 followed by the label of the original structure f.
- the label of the new structure f is 01 followed by the label of the original structure f.

FIG. 2c shows a type d triangular structure 231 which is actually an isosceles triangle. If the sides of the type d triangle have a value equal to 1, i.e. corresponding to unity, the base has a length equal to the inverse of the golden ratio expressed in the previously defined unit. The reference 232 illustrates the rule of subdivision of a type d structure. Thus, a type d triangle is subdivided into two triangles including one type f triangle 233 and one type e triangle 234. The side common to the triangles 233 and 234 is plotted from the right-hand corner of the triangle 231, the triangle 231 being oriented with its vertex upwards, the triangles 233 and 234 being isosceles triangles and the vertex of the triangle 233 being the right-hand corner of the triangle 231.

The labels of the new type d and e structures thus obtained are derived from the following rules:
- the label of the new structure d is 10 followed by the label of the original structure,
- the label of the new structure e is 10 followed by the label of the original structure.

FIG. 2c shows a type e triangular structure 235 which is actually an isosceles triangle. If the sides of the type e triangle have a value equal to 1, i.e. corresponding to unity, the base has a length equal to the golden ratio expressed in the previously defined unit. The reference 236 illustrates the rule of subdivision of a type e structure. Thus, a type e triangle is subdivided into three triangles including one type f triangle 237 one type c triangle 238, one type e triangle 239, as well as one type a sampling structure 240. The triangle 235 is deemed to have its vertex oriented upwards. The triangle 239 is obtained in subdividing the triangle 235 into two, along a straight line coming from the vertex of the triangle 235 and intercepting the base of the triangle 235 at a distance of 1 from the left-hand corner of the triangle 235. The triangle 239 is the right-hand part of the triangle 235 thus subdivided.

The left-hand part resulting from this first subdivision is again divided by a second subdivision along a straight line coming from the vertex of the triangle 239 and intercepting the left-hand side of the triangle 235 at a distance equal to the inverse of the golden ratio squared of the vertex of the triangle 235. The right-hand part of the second subdivision is the triangle 238, the other part being the triangle 237. The sampling structure 240 corresponds to the vertex of the triangle 237.

The labels of the new type a, c, e and f structures thus obtained are derived from the following rules:
- the label of the new structure a is 10 followed by the label of the original structure e,
- the label of the new structure c is 10 followed by the label of the original structure e,
- the label of the new structure e is 01 followed by the label of the original structure e.
- the label of the new structure f is 00 followed by the label of the original structure e.

Once the subdivision structures have been subdivided and named according to their origin, the method passes to a step for assessing an end-of-subdivision criterion. In practice, each new subdivision structure is subdivided again so long as an end-of-process criterion has not been attained.

In the invention, this criterion is a twofold one. The first condition is that the density of sampling structure per unit of surface area must be below a predetermined threshold. If this threshold is crossed, the subdivision process stops. This is equivalent to fixing a minimum surface area for the surface of the subdivision structures.

The other part of the end-of-subdivision criterion is a criterion of intensity of the image. The subdivision in a region of the image stops as soon as the intensity of the image in a subdivision structure goes below a predetermined threshold. This condition makes the subdivision process adaptive, i.e. the subdivision process adapts to the nature of the image. In other words, a subdivision structure corresponding to a low-intensity region of the image will no longer be subdivided.

In one variant, the subdivision stopping criterion is such that the subdivision is stopped when the number of subdivisions defined by the grey levels located within the subdivision structure is attained. For a grey level x, the number of subdivisions is given, for example, by the following formula:

$$\lambda(x) = \log_{phi\,2}(\sqrt{5}\cdot x).$$

For each subdivision structure, the number N of subdivisions that had to be performed to obtain this subdivision is considered. Then, $\lambda(x)$ is computed for the vertices of the subdivision structure. The subdivision of the structure is interrupted if none of the $\lambda(x)$ values computed is greater than N.

Another variant implicates other dots of the subdivision structures, or the centers of the sampling structures associated with the subdivision structure for which the stopping criterion has been assessed. In these variants, with each subdivision structure, the method therefore associates a number of subdivisions that had had to be made to arrive at this subdivision structure.

An illustration has just been given of an example of aperiodic tiling based on the use of triangles. The Penrose tiling implements quadrilaterals. The Amman Beeker tiling implements far more complex polygons. The utility of using triangles lies in their simple structure which facilitate the computations to carry out the tiling.

The use of dimensions related to the golden ratio enables the subdivision structures to be subdivided into structures for which the ratio of the areas is equal to the golden ratio squared.

Once the tiling is completed, the method passes from the step 104 to a step 105 for determining the thresholds. The thresholds are those used for the implementation of the algorithms by threshold matrix or by error diffusion. In the case of the use of error diffusion, the threshold can be set at about 127, i.e. in the middle of the dynamic range of the pixels which are encoded with an intensity which is in the interval [0 . . . 255]. In practice, the threshold itself is in the interval [124 . . . 128], with the dynamic range envisaged here above. In the invention, each sampling structure has a threshold associated with it. In one variant of the invention, the thresholds are dependent on the labels associated with the sampling structures. For example, the label of the invention is converted into a decimal base from its binary expression. A function is then applied to this conversion, the to-space of which is the interval [0 . . . 255]. This conversion is carried out for example in a base whose description vectors are the elements of the Fibonacci sequence as described here below for the production of the first input in the table of correction vectors. In this case, as many elements of the Fibonacci sequence are used as the label comprises digits, in starting with the second element of the Fibonacci sequence.

From the step 105, the method passes to a step 106 for correction of the positions of the sampling structures. As already specified, each sampling structure corresponds to a pixel of the image on which the tiling is made. In the step 106, a modification is made, before printing, of the position of the sampling structures, hence the position of the pixels associated with these sampling structures. This correction is also called a relaxation or a relaxation process.

This correction is made as a function of a correction table comprising correction vectors. A correction table enables a correction vector to be associated with each sampling structure. A correction table has two inputs. A first input is dependent on the label of the sampling structure.

As illustrated here above, the label associated with the structure, in particular the sampling structure, is binary. The six most significant bits of the table are used to produce a first input, the value of each of these bits being multiplied by Fi where i is in the interval [2, 7], and Fi is the corresponding number of the Fibonacci sequence, the most significant bit being multiplied by F7, the less significant bit by F6, and so on and so forth until the sixth significant bit.

Thus, for a sampling structure whose label is:
10101010101
the value of the first input is
1xF7+0xF6+1xF5+0xF4+1xF3+0xF2
giving
1x13+0x8+1x5+0x3+1x2+0x1=20

The following convention has been applied here for the Fibonacci sequence: F0=0, F1=1, F2=1, F3=2, F4=3, F5=5, F6=8, F7=13. This sequence continues but in the context of the invention, only the first eight terms are useful for the definition of the first input.

It can be noted that, with the chosen mode of assignment of the labels, a label cannot contain two consecutive 1s. The values for the first input are therefore in the integer interval [0,20]. The first input is called a structural index.

A second input in a correction table is dependent on the intensity of the pixel associated with the sampling structure.

In one embodiment, the second input is equal to:

$$\log_{phi\,2}(\sqrt{5}\cdot x)\bmod 1$$

where phi is the golden ratio and x is the intensity of the image associated with the sampling structure. The real interval [0, 1] of arrival of the function is divided into N intervals, thus enabling the result of the preceding function to be associated with an integer in the interval [0, N−1], this integer then being the second input. This second input is called an index of importance.

In one example N equals 8, and the real interval [0, 1] is divided into N disjoined intervals of identical sizes such that their union is the real interval [0, 1]. In this example, the second input is included in the integer interval [0, 7].

Thus, in the chosen example, the table of the correction vectors is sized 21×8=168. These 168 correction actors are predetermined. Such a table is for example the following.

|   | 0 | 1 | 2 | 3 | 4 | 5 | 6 | 7 |
|---|---|---|---|---|---|---|---|---|
| 0 | (−.014, .018) | (.025, −.082) | (.049, −.097) | (.055, −.090) | (.038, −.074) | (−.006, −.058) | (−.027, −.028) | (−.018, .012) |
| 1 | (.013, −.007) | (−.133, −.292) | (−.208, −.358) | (−.197, −.380) | (−.129, −.323) | (−.066, −.266) | (−.029, −.218) | (−.004, −.204) |
| 2 | (.011, −.343) | (.079, −.563) | (.095, −.604) | (.072, −.583) | (−.053, −.504) | (−.144, −.383) | (−.170, −.265) | (−.124, −.172) |
| 3 | (.014, −.197) | (.085, −.233) | (.148, −.106) | (.236, .143) | (.317, .307) | (.345, .364) | (.296, .330) | (.198, .233) |

-continued

|  | 0 | 1 | 2 | 3 | 4 | 5 | 6 | 7 |
|---|---|---|---|---|---|---|---|---|
| 4 | (.036, .044) | (.180, −.014) | (.278, .078) | (.330, .222) | (.348, .358) | (.350, .386) | (.300, .367) | (.215, .301) |
| 5 | (.227, .365) | (.363, .061) | (.342, −.094) | (.268, −.156) | (.152, −.091) | (.004, .082) | (−.060, .256) | (−.039, .392) |
| 6 | (.171, .446) | (.301, −.089) | (.243, −.224) | (.132, −.229) | (−.052, −.258) | (−.228, −.155) | (−.266, −.013) | (−.200, .140) |
| 7 | (−.235, .391) | (−.580, .059) | (−.651, −.114) | (−.709, −.313) | (−.720, −.432) | (−.694, −.411) | (−.593, −.245) | (−.473, −.057) |
| 8 | (−.002, 1.019) | (.801, .846) | (.118, .731) | (.168, .560) | (.182, .381) | (.221, .263) | (.216, .253) | (.197, .294) |
| 9 | (0, 0) | (−.125, .256) | (−.108, .273) | (−.065, .249) | (.006, .171) | (.064, .086) | (.084, .026) | (.072, −.013) |
| 10 | (0, 0) | (−.047, .030) | (−.104, .082) | (−.146, .159) | (−.173, .219) | (−.173, .221) | (−.151, .144) | (−.134, .077) |
| 11 | (0, 0) | (−.070, .251) | (−.147, .532) | (−.177, .710) | (−.199, .735) | (−.187, .607) | (−.160, .366) | (−.114, .206) |
| 12 | (0, 0) | (.001, .045) | (.003, .124) | (.009, .290) | (.012, .354) | (.011, .324) | (.010, .182) | (.019, .065) |
| 13 | (0, 0) | (0, 0) | (.020, .012) | (.063, .041) | (.148, .096) | (.198, .131) | (.218, .131) | (.212, .120) |
| 14 | (0, 0) | (0, 0) | (.017, .026) | (.048, .074) | (.107, .166) | (.124, .194) | (.117, .190) | (.099, .165) |
| 15 | (0, 0) | (0, 0) | (0, 0) | (.012, .025) | (.038, .073) | (.092, .168) | (.124, .199) | (.138, 203) |
| 16 | (0, 0) | (0, 0) | (0, 0) | (−.009, .009) | (−.024, −.035) | (−.501, .094) | (−.044, .158) | (−0.33, .203) |
| 17 | (0, 0) | (0, 0) | (0, 0) | (0, 0) | (−.008, .018) | (−.025, .058) | (−.051, .136) | (−.059, .184) |
| 18 | (0, 0) | (0, 0) | (0, 0) | (0, 0) | (.004, .010) | (.003, .031) | (−.011, .069) | (−.049, .090) |
| 19 | (0, 0) | (0, 0) | (0, 0) | (0, 0) | (0, 0) | (.016, .013) | (−.045, .030) | (−.100, .067) |
| 20 | (0, 0) | (0, 0) | (0, 0) | (0, 0) | (0, 0) | (−.010, .034) | (−.029, .078) | (−.064, .174) |

These correction vectors are applied to the position of the pixels associated with each sampling structure coming from the tiling process. Thus, these sampling structures are not affected by the relaxation process linked to the correction table. Only the pixels linked to these sampling structures are affected by this relaxation process.

The corrections are expressed in a unit relative to the sampling structure to which the correction is made. According to the method of the invention, each sampling structure is attached to a subdivision structure for which a unit is defined. For a given sampling structure, it is this unit that is used for the interpretation of correction vectors.

From the step 106 the method passes to a printing step 107 in which the screening device prints out the thresholded pixels corresponding to the sampling structures obtained by the method described, or writes them to a memory or displays them on a screen. This method therefore enables the association, with the pixels, of a sampling structure, hence a threshold used to decide whether the pixels must be printed or not and of a correction vector used to shift the pixel relative to its original position. In practice, a pixel is printed only if its value is above the threshold associated with it. This is valid for all the pixels of an image. In one variant, the inverse criterion is used.

It may be recalled here that an error diffusion algorithm is also based on threshold setting but the error made between the pixel screened and the output value chosen (0 or 255) is diffused in the non-processed neighborhood of the pixel being screened. The neighborhood is constituted by the pixels immediately neighboring those that are processed. The error is diffused weighted by a coefficient. Each neighbor has its own coefficient. Such coefficients, and this algorithm, were defined as of 1975 by Floyd and Steinberg. In practice, it is the coefficients defined by Floyd that are used, but nothing in the invention goes against the implementation of another set of coefficients.

Thus, the distribution according to the Penrose tiling described only attributes certain threshold values in a matrix used in the implementation of an error diffusion algorithm or a threshold matrix algorithm.

Thus, the method of the invention can be summarized as follows:
1. A block of an image of a given dimension is retrieved, and a matrix (called a threshold matrix) with the same size as the image block is initialized with the value representing half of the dynamic range (127 in the present case)
   a. The adaptive subdivision of the image is performed to create a tiling
      i. Each subdivision structure is subdivided until a stop criterion is reached.
   b. From the tiling, a matrix of sampling dots is created. For each sampling structure:
      i. A threshold is computed as a function of the label
      ii. Its coordinates defined in $R^2$ are retrieved
      iii. The correction is applied thereto in using the structural index and index of importance
      iv. The corrected coordinates are made discrete to obtain discrete coordinates of a dot of the threshold matrix
      v. The computed threshold is inserted into the step (i.) in the threshold matrix at the position computed in the step (iv.)
   c. The error diffusion algorithm is applied. The algorithm is applied to the interior of the image block and for each pixel, the threshold coming from the matrix of thresholds is applied.

The method thus implemented makes it possible to do without all the artifacts that a less sophisticated screening method allows to persist.

This method has the advantage wherein it can be implemented either on a complete image or on blocks of this image. In a classic example, a block is sized 16 pixels by 16 pixels, or 32 pixels by 32 pixels. The method of the invention is quite applicable to bigger blocks but this is not the case in the context of traditional printing. Naturally, traditionally, in the case of block processing, the errors at the ends of the blocks (right-hand side and bottom side) are transmitted to the neighboring blocks.

In a preferred example of implementation, the vectors of the correction table are pre-computed in a step 108 prior to the step 106, according to a method implementing the tiling method used in the invention. The vectors of the correction table are independent of the processed image. A mode of production of the table of correction vectors is now described in a preliminary step, the table of correction vectors is initialized, all the vectors being at zero (0, 0).

For each index of importance, an image comprising a cloud of dots is produced, for example randomly, the grey levels of these dots corresponding to the index of importance. For this image, a tiling is performed according to the method implemented by the invention, by which sampling structures are obtained at given positions. A relaxation algorithm, for example Lloyd's algorithm is then applied to these sampling structures, each structure being considered to be a dot and being associated with the structural index.

In a simplified way, Lloyd's algorithm can be expressed as follows:
1. A set of dots (in this case the sampling structures) is taken,
2. The Voronoï polygonization is performed on the set of dots,
3. For each polygon surrounding the dots, the barycenter is computed and the polygon generating dot is shifted to the barycenter,
4. The steps 2 and 3 are repeated up to convergence Then, for each structural index, the mean Vm of the shifts of the dots relative to their original positions is computed. This mean is used to compute the mean correction vector with the vector already present in the correction table. The table is therefore updated according to the following formula:

$$V=(k\cdot V+Vm)/(k+1)$$

where k is the number of clouds of dots already produced for the importance index.

These operations are repeated until stabilization of the correction vectors, i.e. until the contribution of Vm becomes negligible for the value V.

Once the table is obtained, the equivalent of a filtering operation is performed through a low-pass filter. This has the effect of canceling a certain number of correction vectors.

These steps, corresponding to the step 108, are used to determine a table of correction vectors that can be used by the method according to the invention. In the measurement, the correction table which can be called also a relaxation table is pre-computed. The method of the invention performs particularly well. The steps are performed only once for all the screening devices implementing the method of the invention in using a given tiling method. In practice, the step 108 is therefore not implemented by the screening devices, but the result of the step 108 is stored in a memory of the screening device.

The invention claimed is:

1. A method for screening an image before printing, comprising the following steps implemented by a screening device:
    tiling the image to be screened by an aperiodic structure obtained by the implementation of a self-similar structure, the tiling being done from a structure divided according to rules to give new structures which are again divided according to these same rules, among the structures, sampling structures and subdivision structures are distinguished, and only the subdivision structures are again divided;
    the tiling being adaptive in that it depends on the intensity of the zone of the image covered by the structure to be divided, the division of the structure being interrupted when this intensity becomes lower than a predetermined threshold;
    the division being interrupted when the density of structure per unit of surface area of the image becomes higher than a threshold;
    at each division, the screening device assigning a label to each new structure as well as to the existing sampling structures;
    at the end of the tiling process, each sampling structure being associated with a pixel that is shifted as a function of a correction vector found in a dual-input correction table, the first of the inputs being dependent on the label of the sampling structure, the second of the inputs being dependent on the intensity of the image at the point corresponding to the sampling structure, each sampling structure remaining associated with a dot of the image that has served it as an input in the correction table;
    each sampling structure having an associated threshold as a function of the label of the sampling structure; and
    the thresholds determined in the previous steps being used to implement a halftone rendering method.

2. A method according to claim 1 wherein the halftone rendering method implemented is a threshold matrix method.

3. A method according to claim 1, wherein the halftone rendering method implemented is an error diffusion method.

4. A method according to claim 1, wherein the subdivision structures are polygons.

5. A method according to claim 1, wherein the polygons are triangles.

6. A method according to claim 1, wherein the label of a new structure is derived from the label of the structure from which it had been created.

7. A method according to claim 1 wherein, before the use of the thresholds determined in the preceding steps for the implementation of a halftone rendering method, the screening device implements a relaxation algorithm on the sampling structures to produce the correction vectors of the correction table.

8. A method according to claim 1, wherein during the subdivision of a subdivision structure into two new subdivision structures, the ratio of the areas of the new structures is constant for all the subdivisions.

9. A method according to claim 8, wherein the ratio is equal to the golden ratio squared, one value of which, rounded out to the second decimal point, is 1.61.

10. A method according to claim 1, wherein the label associated with the structure is binary, the six most significant bits of this label being used to produce the first input, the value of each of these bits being multiplied by Fi where ii in the interval [2, 7], and Fi is the number corresponding to the Fibonacci sequence, the most significant bit being multiplied by F7, the less significant bit by F6, and so on up to the sixth most significant bit.

11. A method according to claim 1, wherein the second input is equal to:

$$\log_{phi\,2}(\sqrt{5}\cdot x) \bmod 1$$

where phi is the golden ratio, and x is the intensity of the image associated with the sampling structure, the real interval [0, 1] being divided into N intervals, thus enabling the association of the preceding function result with an integer in the interval [0, N−1], this integer being the second input.

12. A method according to claim 1, wherein N is equal to 8.

13. A method according to claim 1, wherein the image to be processed is divided into blocks, each of these blocks being processed by the method.

* * * * *